United States Patent
Whitney

(10) Patent No.: US 7,554,043 B2
(45) Date of Patent: Jun. 30, 2009

(54) WEIGHING SCALE HAVING DUAL HOUSINGS

(75) Inventor: Ryan S. Whitney, Essex Junction, VT (US)

(73) Assignee: Edlund Company, Inc., Burlington, VT (US)

(*) Notice: Subject to any disclaimer, the term of this patent is extended or adjusted under 35 U.S.C. 154(b) by 84 days.

(21) Appl. No.: 11/744,039

(22) Filed: May 3, 2007

(65) Prior Publication Data

US 2008/0271929 A1    Nov. 6, 2008

(51) Int. Cl.
*G01G 21/28* (2006.01)
(52) U.S. Cl. ...................................... 177/238
(58) Field of Classification Search .............. 177/238, 177/244, 184
See application file for complete search history.

(56) References Cited

U.S. PATENT DOCUMENTS

| | | | |
|---|---|---|---|
| 4,313,509 A * | 2/1982 | Engels | 177/50 |
| 4,320,809 A * | 3/1982 | Knothe et al. | 177/243 |
| 4,512,428 A | 4/1985 | Bullivant | |
| 4,575,804 A | 3/1986 | Ratcliff | |
| 4,890,246 A | 12/1989 | Oldendorf et al. | |
| 4,898,254 A | 2/1990 | Fukui | |
| 4,907,179 A | 3/1990 | Oldendorf et al. | |
| 5,332,182 A * | 7/1994 | Weisz et al. | 248/188.4 |
| 5,589,670 A | 12/1996 | Berli | |
| 5,653,417 A * | 8/1997 | DeBarber et al. | 248/688 |
| D415,701 S | 10/1999 | Sunako | |
| 6,137,065 A | 10/2000 | Zefira | |
| 6,359,239 B1 | 3/2002 | Missler et al. | |
| 6,407,351 B1 * | 6/2002 | Meyer et al. | 177/238 |
| 6,489,596 B2 | 12/2002 | Chu | |
| 6,713,690 B2 * | 3/2004 | Bierich et al. | 177/180 |
| 6,777,625 B2 | 8/2004 | Oldendorf | |
| D498,155 S | 11/2004 | Sato et al. | |
| 6,812,414 B2 * | 11/2004 | Nakagawa | 177/211 |
| 6,978,221 B1 | 12/2005 | Rudy | |
| 7,002,084 B2 * | 2/2006 | Cox et al. | 177/238 |
| 7,221,415 B2 * | 5/2007 | Ono et al. | 349/63 |
| 7,232,963 B2 * | 6/2007 | Leisinger et al. | 177/238 |
| 7,256,355 B2 * | 8/2007 | Tempelman et al. | 174/350 |
| 7,256,357 B1 * | 8/2007 | Kesselman | 177/25.15 |
| 7,397,003 B2 * | 7/2008 | Cox et al. | 177/238 |
| 2002/0124017 A1 | 9/2002 | Mault | |
| 2004/0118618 A1 | 6/2004 | Davidson et al. | |
| 2006/0054335 A1 * | 3/2006 | Rapp et al. | 174/48 |

FOREIGN PATENT DOCUMENTS

JP        363103921 A    5/1988

* cited by examiner

*Primary Examiner*—Randy W Gibson
(74) *Attorney, Agent, or Firm*—Downs Rachlin Martin PLLC

(57) ABSTRACT

An electronic weighing scale that includes an inner housing and an outer housing surrounding the inner housing. In one embodiment, the inner and outer housings are not secured to one another and are spaced apart by shock-absorbing spacers designed to absorb shock of impact loads such as may be caused by the scale being dropped. The inner housing includes a chassis defining a load cell cavity that contains a load cell. The inner housing also includes an electronics compartment closure that together with the chassis define an electronics compartment that contains electronics of the scale, including display electronics and user-controls electronics. In one embodiment, the electronics compartment is hermetically sealed to protect the electronics from moisture.

20 Claims, 4 Drawing Sheets

WEIGHING SCALE HAVING DUAL HOUSINGS

FIELD OF THE INVENTION

The present invention generally relates to the field of weighing instruments. In particular, the present invention is directed to a weighing scale having dual housings.

BACKGROUND

Instruments for weighing things are used in many settings, such as laboratories, kitchens, mailrooms and post offices, and physicians' offices and hospitals, among many others. Often, instruments such as kitchen scales and laboratory scales must operate in environments in which the instruments are exposed to getting wet and/or dirty, e.g., from spillage or other mishandling of substances in proximity to the instruments and/or from periodic washing/cleaning of the instruments. In addition, weighing scales can be subjected to rough handling, particularly, for example, in kitchen settings. Some scales lack the robustness necessary to stand up to these harsh conditions, particularly over extended periods.

SUMMARY OF THE DISCLOSURE

In one embodiment, the present disclosure is directed to a weighing scale. The weighing scale includes: a force transducer; user-interface electronics in electrical communication with the force transducer, the user-interface electronics for displaying weighing information to a user; an inner housing defining a compartment containing the user-interface electronics; and an outer housing enclosing the force transducer and the inner housing.

In another embodiment, the present disclosure is directed to an electronic scale. The electronic scale includes: a chassis that defines a user-interface-electronics compartment and a load-cell cavity spaced from the user-interface-electronics compartment; a load cell contained in the load-cell compartment; user-interface electronics in electrical communication with the load cell contained in the user-interface-electronics compartment; and a housing that surrounding the chassis so as to enclose therein the user-interface-electronics compartment and the load-cell compartment.

In a further embodiment, the present disclosure is directed to a scale. The scale includes: a weighing mechanism for determining a weight of a mass applied to the weighing scale; a display in operative communication with the weighing mechanism for displaying the weight to a user; a chassis supporting each of the weighing mechanism and the display, the chassis having an upper side and a lateral periphery; an outer housing secured substantially enclosing the upper side and the lateral periphery of the chassis, the outer housing have lateral sides each spaced from the lateral periphery of the chassis; and a plurality of spacers each extending between the lateral periphery of the chassis and a corresponding one of the lateral sides of the housing; each of the plurality of spacers secured to one of 1) the chassis and 2) the housing.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
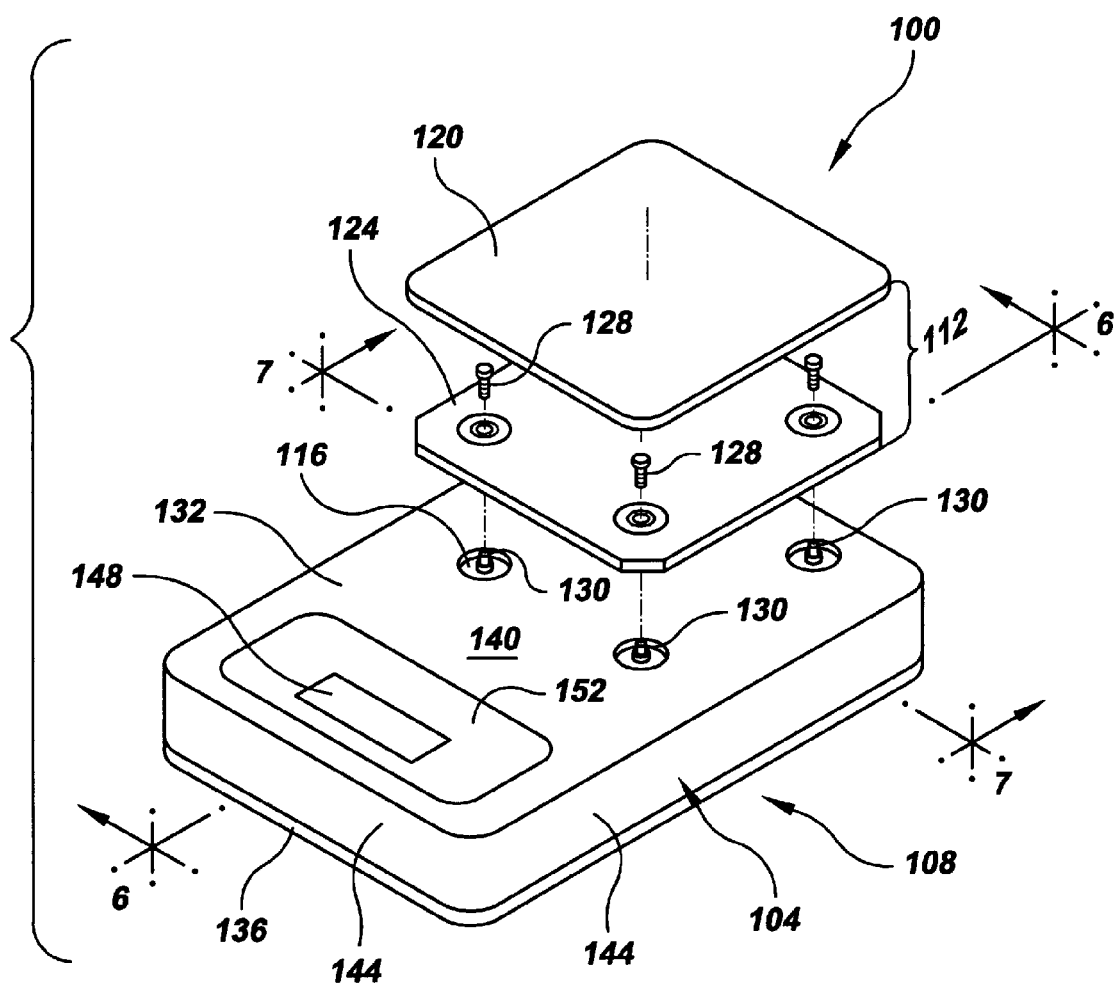
FIG. 1 is a partially exploded isometric view of a dual-housing weighing scale made in accordance with the present invention.

Referring now to the drawings, FIG. 1 illustrates an example 100 of a dual-housing scale made in accordance with the present invention. As will be seen and understood from the above-identified drawings and the following description, scale 100 includes two housings, namely an "outer" housing 104, as seen, for example, in FIG. 1, and an "inner" housing, which may be seen in FIGS. 2, 6 and 7 as element 200. This dual-housing construction of scale 100 readily permits designers to make the scale very robust in terms of impact resistance, moisture resistance and a combination of both of these. This construction also facilitates ease of manufacture and, therefore, relatively low cost for the level of robustness provided. Features that contribute to this robustness and ease of manufacture are described below.

Referring still to FIG. 1, exemplary scale 100 includes a base 108 and a weight receiver 112 for receiving the thing(s) (not shown) to be weighed by the scale. As described in more detail below, base 108 may include a load cell 116 or other apparatus for determining the weight of the thing(s) being weighed. Weight receiver 112 may, but need not necessarily, include a weighing pan 120 and a weighing pan support 124. Weighing pan support 124 can be fastened to a load cell 116 in any suitable manner, such as using threaded fasteners 128. In this example, load cell 116 includes four supports 130 (three of which are shown in FIG. 1) for securing weighing pan support 124 to the load cell. In other embodiments, other load cell designs may have another number of supports, such as one, two, three, etc. Depending on the degree of watertightness desired and whether or not load cell 116 itself is watertight/water resistant, each support 130 may engage with a flexible or otherwise movable closure (not shown), such as a flexible boot, that may be secured to upper portion 132 of outer housing 104, the load cell, or both. Weighing pan 120 may be removable if desired, e.g., to facilitate cleaning and/or periodic replacement of the pan. For example, weighing pan 120 may not be fastened to weighing pan support 124 but may simply rest on the support. In another example, weighing pan 120 may be provided with downwardly extending peripheral edges that provide a snap fit with weighing pan support 124. Weighing pan 120 and weighing pan 124 may each be made of any suitable material such as metal or plastic.

Outer housing 104 may comprise one or more pieces. In the example shown, outer housing 104 is a two-piece housing having an upper portion 132 and a lower portion 136. Upper portion 132 includes a top 140 and downwardly depending lateral sides 144, and the upper portion is made of stainless steel and the lower portion is made of plastic. In other embodiments, upper and lower portions 132, 136 may be made of other materials as desired. The choice of material is largely influenced by the type of environment scale 100 is designed to be used in and the desired durability and shock resistance of the scale (see below).

Figure 2:
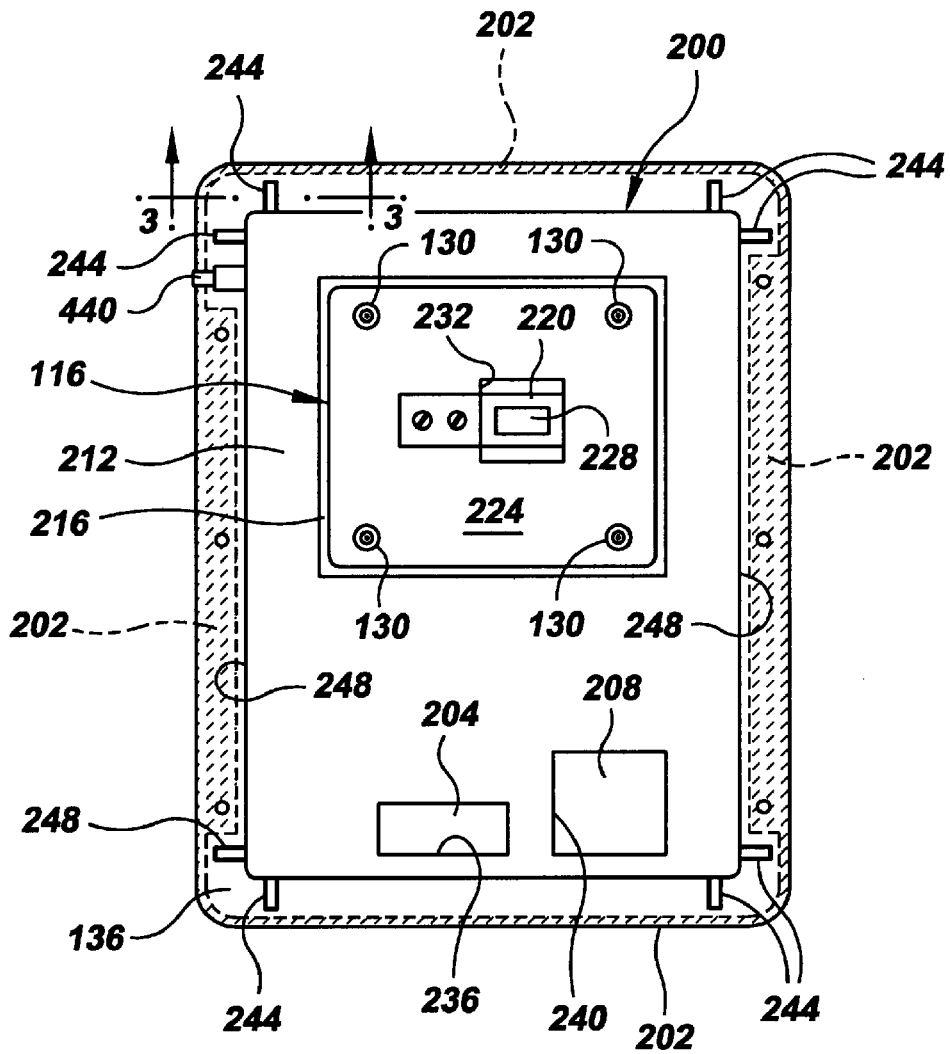
FIG. 2 is a top view of the base of the dual-housing scale of FIG. 1 with the upper portion of the outer housing removed.

The various parts of outer housing 104, here upper portion 132 and lower portion 136, may be secured together and/or engage each other in any suitable manner. For example, upper and lower portions 132, 136 are fastened together with screws 708 (FIG. 7) that, in this example, extend through lower portion 136 and threadedly engage corresponding respective screw-holes (not shown) in a set of tabs 712 extending inwardly from the lower edges of two of lateral sides 144 of upper portion 132. For clarity, FIG. 2 depicts as phantom hatching 202 the regions of tabs 712 (FIG. 7) and the lower edge of lateral sides 144 (FIGS. 1, 6 and 7) of upper portion 132 that confront lower portion 136. In other embodiments, outer housing 104 may be fitted with various types of tab and slot arrangements that act as hinges and/or latches. In yet other embodiments, upper and lower portions 132, 136 may engage one another by interference fit in any number of configurations. Broadly, virtually any sort of securing and/or engaging means and configurations may be used to secure upper and lower portions 132, 136 together.

Figure 4:
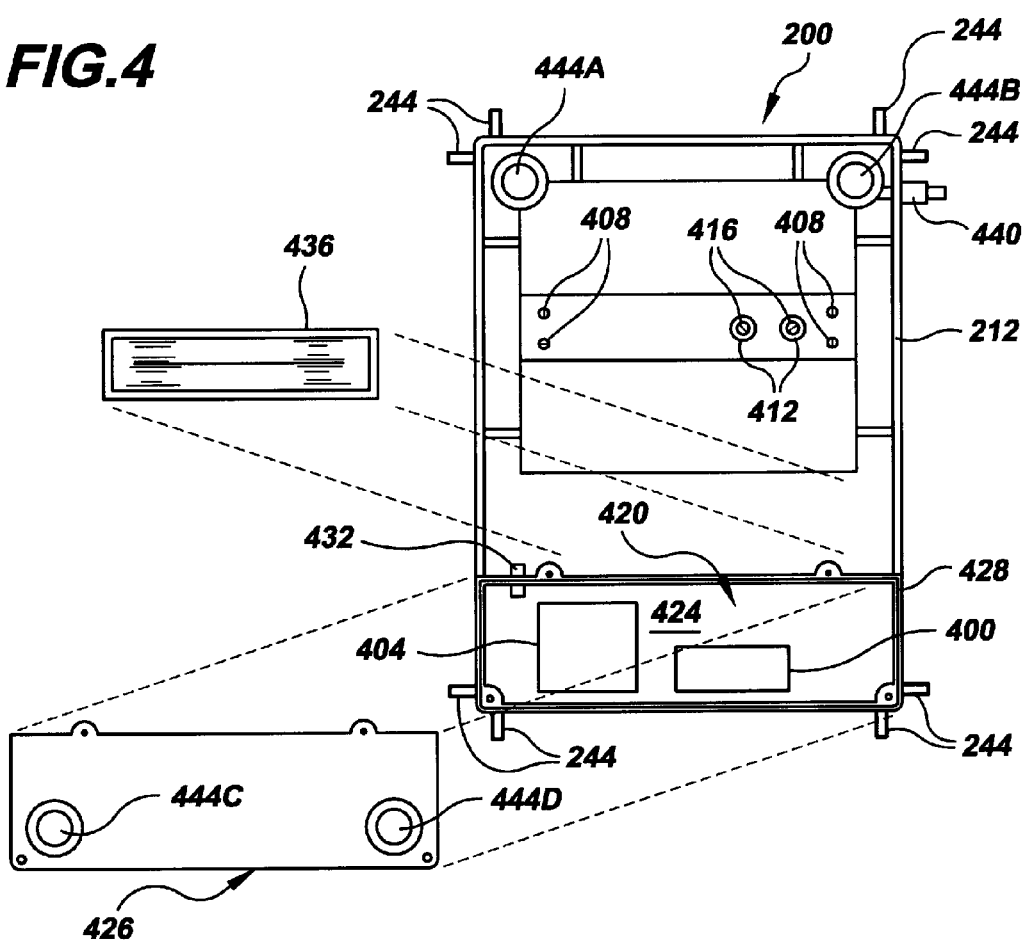
FIG. 4 is a partially exploded bottom view of the inner housing of the scale base shown in FIGS. 1 and 2.

Depending on the configuration of scale 100, outer housing 104 may include one or more user-interface windows, such as a display window 148 that allows a user to view a display, for example, an electronic display 204 (FIG. 2) of display electronics 400 (FIG. 4). Display window 148 may simply be an opening in outer housing 104 or, alternatively, may include a transparent plate or sheet, e.g., of plastic or glass. If outer housing 104 is made of plastic, such a transparent material window may be integrally molded with the rest of the housing, or part thereof, in this case upper portion 132. If the transparent material window is formed separately from the rest of outer housing 104, it may be secured and sealed to the housing in a manner that inhibits liquids and other substances from entering the outer housing.

Figure 6:
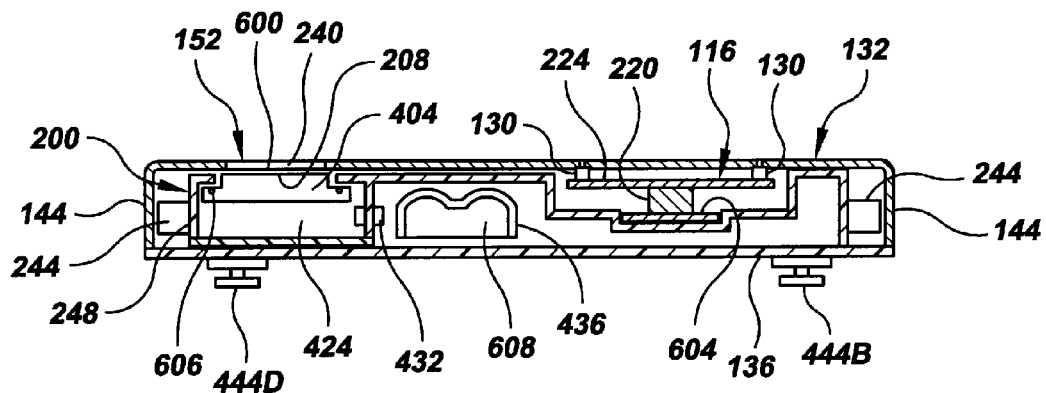
FIG. 6 is an enlarged cross-sectional view of the scale base as taken along line 6-6 of FIG. 1.

Outer housing 104 may also include a user-controls region 152 located, for example, adjacent to display window 144. In this example, user-controls region 152 is configured for a touchpad 208 (FIG. 2) of user-controls electronics 404 (FIGS. 4 and 6). As seen in FIG. 6, for a touchpad configuration, user-controls region 152 may include a flexible sheet 600 that forms a resilient covering for touchpad 208 (FIG. 2). If flexible sheet 600 is formed separately from outer housing 104, it may be secured and sealed to the rest of the outer housing so as to inhibit liquids and other substances from entering the outer housing.

Figure 7:
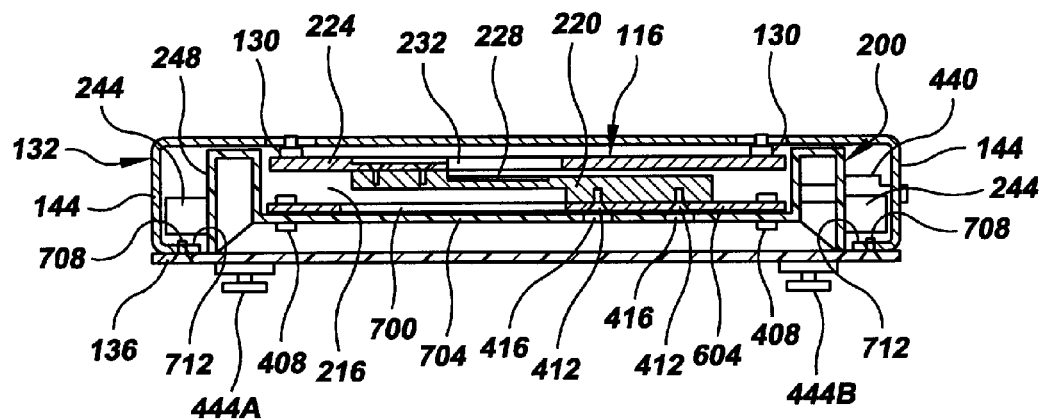
FIG. 7 is a further enlarged cross-sectional view of the scale base as taken along line 7-7 of FIG. 1.

FIGS. 2 and 4 generally show inner housing 200 in isolation to clearly illustrate its various features. As seen in FIG. 2, inner housing 200 includes a chassis 212 that supports the primary working components of scale 100 (FIG. 1), such as load cell 116, display electronics 400 (FIG. 4) and user-controls electronics 404 (FIG. 4). Chassis 212 may be made of any suitable material(s), such as plastic and metal, or a combination of both, and may be either unitary monolith (e.g., a single molding) or may be an assembly of discrete components. Chassis 212 may include a load-cell cavity 216 that contains load cell 116. Referring to FIG. 2, and also to FIGS. 6 and 7, load cell 116 may be of the cantilever type that includes a cantilever support 220 fixed at one end to chassis 212, for example, via a base plate 604 (FIGS. 6 and 7). The other end of cantilever support 220 may have affixed thereto a weight-receiver support plate 224 to which supports 130 are attached. Cantilever support 220 has secured thereto a force transducer for sensing the weight of the thing(s) being weighed by scale 100 (FIG. 1).

In this example, the force transducer is a strain transducer 228 (FIGS. 2 and 7) located on cantilever support 220 so as to sense the elongation of the top of the cantilever support as the it bends in response to the weight applied to scale 100 (FIG. 1). In other embodiments, the force transducer may be of another type, such as a displacement sensor, among others. Suitable force transducers for use in scale 100 are readily available or, if needed, could be made by any number of manufacturers. In this example, weight-receiver support plate 224 includes a window 232 (FIGS. 2 and 7) that allows easy access to strain transducer 228. As seen in FIG. 7, base plate 604 may include a window 700 that allows the bottom wall 704 of load cell cavity 216 to act as a stop for the cantilevered end of cantilever support 220 to inhibit damage to strain transducer 228 in the event that scale 100 (FIG. 1) is overloaded with weight. Base plate 604 may be secured to bottom wall 704 of load-cell cavity 216 in any suitable manner, such as with threaded fasteners 408 (FIGS. 4 and 7). In addition, cantilever support 220 may be secured to base plate 604 in any suitable manner, such as with threaded fasteners 412 (FIGS. 4 and 7). In this connection, as seen in FIGS. 4 and 7, bottom wall 704 of load-cell cavity 216 may be provided with openings 416 for ready access to fasteners 412 for easy removal of cantilever support 220 without the need to remove base plate 604. This speeds the removal and replacement of cantilever support 220 and strain transducer 228 if necessary. Each of base plate 604, cantilever support 220 and weight-receiver support plate 224 may be made any suitable material, such as metal or plastic. Referring still to FIG. 2, chassis 212 may include openings 236, 240 (opening 240 is also depicted in FIG. 6) for, respectively, electronic display 204 and touchpad 208.

Referring now to FIG. 4, and also to FIG. 6, inner housing 200 defines an electronics compartment 420 that contains display electronics 400, user-interface electronics 404 and/or any other electronics necessary to convert the output of strain transducer 228 (FIGS. 2 and 7) or other sensor to weight information that can be displayed to a user. In this example, electronics compartment 420 is formed by an electronics cavity 424 in chassis 212 and a closure 426 that closes the cavity. To protect the electronics within electronics compartment 420, this compartment may be hermetically sealed, for example, by using suitable seals, such as gaskets (e.g., gaskets 428 (FIG. 4), 606 (FIG. 6)) between closure 426 and chassis 212, between display electronics 400 and the chassis around opening 236 and between user-interface electronics 404 and the chassis around opening 340 and one or more seal-type bushings 432 at any penetrations into the electronics compartment, for example, for wires (not shown) to extend through. Of course, other types of seals may be used, such as adhesive and caulk, among others.

Like outer housing 104, each of chassis 212 and electronics compartment closure 426 may be made of any material suitable for the intended use of scale 100 and its desired robustness and shock resistance. For example, in some embodiments it may be desirable for each of chassis 212 and electronics compartment closure 424 to be made of plastic or metal or a combination of these materials. In other embodiments, it may be desirable to have chassis 212 be exclusively made of metal and electronics compartment closure 424 be made exclusively of plastic. Electronics compartment closure 426 may be secured to chassis 212 in any suitable manner, such as screws (not shown), adhesive, etc.

Figure 5:
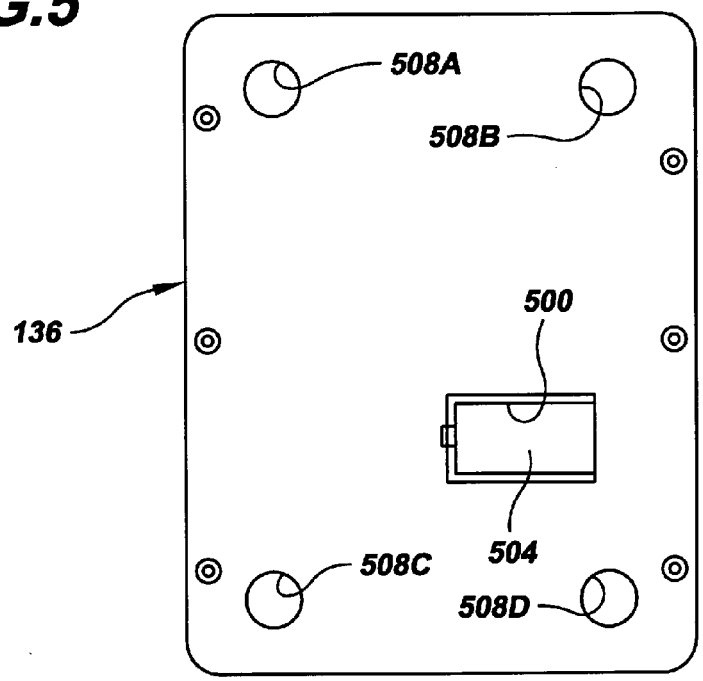
FIG. 5 is a bottom view of the lower portion of the outer housing shown in FIGS. 1 and 2.

If scale 100 (FIG. 1) is, or can be, powered by batteries, inner housing 200 may be provided with a battery receiver 436, which may be either a separate component that may be secured to, for example, chassis 212 or, alternatively, integrally formed with the chassis or other part of base 108 (FIG. 1). In this case, battery receive 436 is configured for receiving a plurality of conventional batteries, but may alternatively be configured for other types of batteries, such as charge-in-place battery packs. Scale 100 (FIG. 1) may also, or alternatively, be powered by another power source, such as a 12V DC power supply, via a power port 440 (FIGS. 4 and 7). Referring to FIG. 5, and also to FIGS. 1, 2 and 6, lower portion 136 may be provided with a battery access opening 500 and a battery compartment closure 504 that allow a user to readily access a battery compartment 608 (FIG. 6) formed when outer housing 104 is installed.

As those skilled in the art will appreciate, in other embodiments battery receiver 436 may be located elsewhere within scale 100 and corresponding battery compartment closure 504 may be located elsewhere on outer housing 104, and/or inner and outer housings 104, 200 may be configured differently so that the closure may be located elsewhere. For example, in other embodiments, the battery compartment may be accessed by removing entire upper or lower portions 132, 136 of outer housing 104, such that a separate battery compartment closure is not needed.

Referring now to FIGS. 4, 6 and 7, depending on the setting in which scale 100 (FIG. 1) is designed to be used, the scale may include feet, here four height-adjustable feet 444A-D, for engaging a support surface (not shown), such as a countertop, workbench or another instrument. Of course, another number of feet may be provided, such as three. As described below in more detail, in example scale 100 outer housing 104 is not attached to inner housing 200 using any fastening means. This independent nature of inner housing 200 may, but need not necessarily, make it desirable to support the inner housing independently of outer housing 104. Therefore, in this example, inner housing 200 is directly supported by feet 444A-D. Also in this example, feet 444A-B are secured directly to chassis 212, whereas feet 444C-D are secured to electronics compartment closure 626. Those skilled in the art will appreciate that feet 444C-D may be secured directly to chassis 212 as well, with suitable modifications made to closure 426. In still other embodiments, any feet that are provided may be secured to the outer housing. As seen in FIG. 5, lower portion 136 of outer housing 104 (FIG. 1) may be provided with openings 508A-D that allow feet 444A-D (FIG. 4) to extend through the lower portion.

Referring to FIGS. 1-4, 6 and 7, in this example 100 of a scale made in accordance with the present invention, the footprint of inner housing 200 is smaller than the footprint of outer housing 104. One reason this may be done is to make scale 100 less susceptible to shock damage from, for example, impact loads caused by the scale being dropped or otherwise falling and impacting a surface. This shock resistance is provided in part by provided shock-absorbing spacers 244 that extend between the lateral periphery 248 of inner housing 200 and lateral sides 144 (FIGS. 1, 6 and 7) of upper portion 132 of outer housing 104. In this example, shock-absorbing spacers 244 are secured to (more specifically integrally molded with) chassis 212 of inner housing 200. However, in other embodiments, some or all of the shock-absorbing spacers, if provided, can be secured to the outer housing. Shock-absorbing spacers 244 shown are designed to yield or otherwise deflect in a manner that allows them to absorb a relatively large amount of energy from an impact load, such from scale 100 being dropped on edge onto a hard surface.

Figure 3:
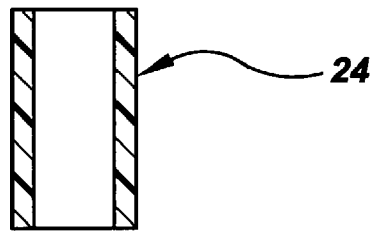
FIG. 3 is a cross-sectional view as taken along line 3-3 of FIG. 2 showing one of the shock-absorbing spacers between the inner and outer housings.

Referring particularly to FIGS. 2-4, in this example shock-absorbing spacers 244 are generally U-shaped thin-walled plastic structures integrally molded with chassis 212. Those skilled in the art will understand that virtually any other shape of structure may be used for shock-absorbing spacers 244, such as I-shaped, H-shaped, O-shaped and zig-zag, among many others. Depending on the material used for shock-absorbing spacers 244, the spacers may be design to be sacrificial in the sense that when subjected to a large design load the spacers may permanently deform or even fracture, while still protecting critical components of scale 100, such as load cell 116, display electronics 400 and user-interface electronics 404, from debilitating damage. While chassis 212 is shown having two shock-absorbing spacers 244 per side located near the corners of the chassis, those skilled in the art will appreciate that the spacers my be provided in other numbers and locations as needed to suit a particular design.

Referring to FIGS. 2 and 7, it was mentioned above that in this example inner housing 200 is not positively fastened to outer housing 104. Rather, inner housing 200 is simply contained within outer housing 104. Relative movement between inner and outer housings 200, 104, however, is limited in this example by the tightness of fit of the inner housing within the outer housing. In the vertical direction, the distance between lower portion 136 and upper portion 132 of outer housing 104 (see, e.g., FIG. 7) is selected to provide a snug fit between outer housing 104 and inner housing 200. If desired the snugness-of-fit can be enhanced using any one or more of a number of techniques, including using resilient pads or other structures (not shown) that are compressed between outer housing 104 and inner housing 200 when the outer housing is installed and designing upper portion 132 and/or lower portion 136 of the outer housing so that they elastically deflect slightly when compressing the inner housing therebetween. In the horizontal directions, similar techniques may be used. For example, lateral sides 144 of outer housing 104 may be designed to elastically deflect slightly when inner housing is compressed between corresponding respective ones of the lateral sides of the upper portion. Alternatively, or in addition, shock-absorbing spacers 244 may be designed to compress slightly when installed between corresponding respective lateral sides 144 of outer housing 104.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A scale, comprising:
   a weighing mechanism for determining a weight of a mass applied to the weighing scale;
   a display in operative communication with said weighing mechanism for displaying said weight to a user;
   a chassis supporting each of said weighing mechanism and said display, said chassis having an upper side and a lateral periphery;
   an outer housing secured substantially enclosing said upper side and said lateral periphery of said chassis, said outer housing having lateral sides each spaced from said lateral periphery of said chassis; and
   a plurality of spacers each extending between said lateral periphery of said chassis and a corresponding one of said lateral sides of said housing; each of said plurality of spacers secured to one of 1) said chassis and 2) said housing;
   wherein at least some of said plurality of spacers are sacrificial spacers designed to be sacrificed in response to predetermined impact loads.

2. The scale of claim 1, wherein said chassis is made of plastic and each of said plurality of spacers is integrally molded with said chassis.

3. The scale of claim 1, wherein said outer housing defines a cavity that is at least substantially entirely surrounded by said outer housing, said chassis contained within said cavity.

4. The scale of claim 3, wherein said chassis is unfastened within said cavity during normal use of the scale.

5. The scale of claim 1, wherein said chassis defines a user-interface-electronics compartment and a load-cell cavity spaced from said user-interface-electronics compartment, the scale further comprising:
- a load cell contained in said load-cell cavity; and
- user-interface electronics in electrical communication with said load cell and contained in said user-interface-electronics compartment;
- wherein said housing surrounds said chassis so as to enclose therein said user-interface-electronics compartment and said load-cell cavity.

6. The electronic scale of claim 5, further comprising a first removable closure sealing said user-interface-electronics compartment, said first removable closure being contained within said housing.

7. The electronic scale of claim 5, wherein said user-interface-electronics compartment and said load-cell compartment are formed on opposite sides of said chassis.

8. The electronic scale of claim 5, wherein said chassis has an upper side and a lower side opposite said upper side, said user-interface-electronics compartment being formed in said lower side, said upper side of said chassis including at least one aperture providing visual access to said user-interface electronics.

9. The electronic scale of claim 5, wherein said housing includes a sealed window region in registration with said at least one aperture so as to provide visual access to said user-interface electronics.

10. The electronic scale of claim 5, wherein said chassis and said housing together define a battery compartment for receiving at least one battery.

11. A scale, comprising:
- a weighing mechanism for determining a weight of a mass applied to the weighing scale;
- a display in operative communication with said weighing mechanism for displaying said weight to a user;
- a chassis supporting each of said weighing mechanism and said display, said chassis having an upper side and a lateral periphery;
- an outer housing secured substantially enclosing said upper side and said lateral periphery of said chassis, said outer housing having lateral sides each spaced from said lateral periphery of said chassis; and
- a plurality of spacers each extending between said lateral periphery of said chassis and a corresponding one of said lateral sides of said housing; each of said plurality of spacers secured to one of 1) said chassis and 2) said housing;
- wherein said chassis defines a user-interface-electronics compartment and a load-cell cavity spaced from said user-interface-electronics compartment, the scale further comprising:
  - a load cell contained in said load-cell cavity; and
  - user-interface electronics in electrical communication with said load cell and contained in said user-interface-electronics compartment;
  - wherein said housing surrounds said chassis so as to enclose therein said user-interface-electronics compartment and said load-cell cavity.

12. The scale of claim 11, wherein said chassis is made of plastic and each of said plurality of spacers is integrally molded with said chassis.

13. The scale of claim 11, wherein at least some of said plurality of spacers are sacrificial spacers designed to be sacrificed in response to predetermined impact loads.

14. The scale of claim 11, wherein said outer housing defines a cavity that is at least substantially entirely surrounded by said outer housing, said chassis contained within said cavity.

15. The scale of claim 14, wherein said chassis is unfastened within said cavity during normal use of the scale.

16. The electronic scale of claim 11, further comprising a first removable closure sealing said user-interface-electronics compartment, said first removable closure being contained within said housing.

17. The electronic scale of claim 11, wherein said user-interface-electronics compartment and said load-cell compartment are formed on opposite sides of said chassis.

18. The electronic scale of claim 11, wherein said chassis has an upper side and a lower side opposite said upper side, said user-interface-electronics compartment being formed in said lower side, said upper side of said chassis including at least one aperture providing visual access to said user-interface electronics.

19. The electronic scale of claim 11, wherein said housing includes a sealed window region in registration with said at least one aperture so as to provide visual access to said user-interface electronics.

20. The electronic scale of claim 11, wherein said chassis and said housing together define a battery compartment for receiving at least one battery.

* * * * *

UNITED STATES PATENT AND TRADEMARK OFFICE
CERTIFICATE OF CORRECTION

PATENT NO.       : 7,554,043 B2                                              Page 1 of 1
APPLICATION NO.  : 11/744039
DATED            : June 30, 2009
INVENTOR(S)      : Ryan S. Whitney It is certified that error appears in the above-identified patent and that said Letters Patent is hereby corrected as shown below:

In the Claims

Column 7, claim 9, line 34. Specifically, delete the word "scaled" and replace to read as "sealed"

Signed and Sealed this
Third Day of June, 2014

Michelle K. Lee
*Deputy Director of the United States Patent and Trademark Office*